(12) United States Patent
Yamagishi et al.

(10) Patent No.: US 6,594,095 B1
(45) Date of Patent: Jul. 15, 2003

(54) MAGNETIC RECORDING APPARATUS AND INTEGRATED CIRCUIT FOR MAGNETIC RECORDING WITH A SHAPED WAVEFORM

(75) Inventors: Michinaga Yamagishi, Kawaski (JP); Yuji Uehara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 85 days.

(21) Appl. No.: 09/696,832

(22) Filed: Oct. 26, 2000

(30) Foreign Application Priority Data

Feb. 16, 2000 (JP) ........................................ 2000-038391

(51) Int. Cl.[7] ................................................ G11B 5/09
(52) U.S. Cl. ............................ 360/46; 360/68; 360/67; 360/65
(58) Field of Search ............................... 360/68, 46, 67, 360/51, 65, 234.4, 244.1

(56) References Cited

U.S. PATENT DOCUMENTS 6,052,017 A * 4/2000 Pidutti et al. .................. 360/68
6,118,602 A * 9/2000 de la Soujeole ............... 360/53
6,181,495 B1 * 1/2001 Makise et al. ................. 360/51

FOREIGN PATENT DOCUMENTS

| JP | 52-100216 | 8/1977 |
| JP | 8287402 | 11/1996 |
| JP | 9044805 | 2/1997 |

* cited by examiner

*Primary Examiner*—Alan T. Faber
(74) *Attorney, Agent, or Firm*—Greer, Burns & Crain, Ltd.

(57) ABSTRACT

A magnetic recording apparatus equipped with a recording circuit for generating a recording current corresponding to an input recording signal, a magnetic head, operable in response to the generated recording current, for recording, in a magnetic recording medium, data corresponding to the input recording signal, and a waveform shaping section for shaping the generated recording current such that a current value of said recording current approximates to a predetermined value while keeping thereover throughout a period corresponding to the data length. Both the recording circuit and the waveform shaping section may be mounted in an integrated form on a single microchip. The result is that the input recording signal can be transferred at high speed as measures are provided to reduce both a rise time and a fall time of the recording current.

17 Claims, 12 Drawing Sheets

MAGNETIC RECORDING APPARATUS AND INTEGRATED CIRCUIT FOR MAGNETIC RECORDING WITH A SHAPED WAVEFORM

BACKGROUND OF THE INVENTION

1. Field of the Invention

The present invention relates to a magnetic recording apparatus and an integrated circuit for magnetic recording which are suitable for use in recording data in a magnetic recording medium, in the form of a disc, or a tape.

2. Description of the Related Art

When data recording is carried out by a magnetic recording apparatus in common use, such as a magnetic disc device or a digital video tape recorder, onto a magnetic recording medium such as a magnetic disc or a magnetic tape, input data (recording signal) received from an upper apparatus or the like is amplified by an amplifier up to a level high enough to cause a flux reversal (hereinafter also called the inversion of magnetization) on the magnetic recording medium, and then recorded by a magnetic head onto the magnetic medium.

At that time, the recording signal (recording current) amplified by the amplifier takes a square waveform whose magnetic polarity is repetitively reversed (positive or negative, or "−" or "+") depending on a sign of the data. The reversal of the polarity (hereinafter also called the inversion of magnetization) takes places each time when the recording current exceeds a predetermined magnetic polarity reversal level (hereinafter also called the magnetization inverse level).

Here, a recording signal large in amplitude elongates the time needed for reversing the polarity. In order to increase a data recording rate onto a magnetic recording medium, a conventional magnetic recording apparatus employs an amplifier having a rising time as short as possible to improve a transfer rate of the recording signal. A recording head is coupled to the amplifier, and overshoot controlling is also performed.

However, such a conventional magnetic recording apparatus still has following problems to be solved. A constant settling level of the recording signal (recording current) makes it difficult to shorten the time needed for reversing the magnetic polarity (a rising time and a falling time).

In contrast to the recent remarkable improvement in the transfer rate of the recording signal, a rising or a falling rate has not yet been improved so much. In particular, since a recording signal large in amplitude needs a long time for reversing its magnetization, it is to be afraid that, when the transfer rate of the recording signal is high, the next inversion of magnetization begins before completion of the current inversion, or before the level of the recording current reaches the magnetic inverse level, thus causing the data recording onto a magnetic recording medium to be incomplete.

SUMMARY OF THE INVENTION

With the foregoing problems in view, it is a first object of the present invention to provide a magnetic recording apparatus for magnetic recording in which a rise time and a fall time of a recording electric current are reduced, enabling a high-rate transmission of the recording current.

A second object of the present invention is to provide an integrated circuit for magnetic recording with which a rise time of and a fall time of a recording current are reduced, enabling a high-rate transmission of the recording current.

In order to accomplish the above first object, according to a first generic feature of the present invention, there is provided a magnetic recording apparatus comprising: a recording circuit for generating a recording current corresponding to an input recording signal; a magnetic head, operative in response to the generated recording current, for recording, in a magnetic recording medium, data corresponding to the input recording signal; and a waveform shaping section for shaping a waveform of the recording current in such a manner that a current value of the recording current infinitely approaches a predetermined value while keeping thereover throughout a period corresponding to the data length.

According to a second generic feature of the invention, there is provided a magnetic recording apparatus comprising: a recording circuit for generating a recording current corresponding to an input recording signal; a magnetic head, operative in response to the generated recording current, for recording, in a magnetic recording medium, data corresponding to the input recording signal; and a waveform shaping section for shaping a waveform of the input recording signal in such a manner that a current value of the recording current infinitely approaches a predetermined value while keeping thereover throughout a period corresponding to a length of the data to be recorded.

As a preferred feature, the magnetic recording apparatus further comprises a data length detecting section for detecting a pulse width of the recording current as the data length. As another preferred feature, both the waveform shaping section and the recording circuit are mounted on a common substrate. As still another preferred feature, the waveform shaping section is in the form of an integrated circuit.

According to a third generic feature, the above second object is accomplished by a magnetic recording integrated circuit for driving a magnetic head which is energized by a recording current to record, in a magnetic recording medium, data corresponding to an input recording signal, the integrated circuit comprising: a recording circuit for generating the recording current corresponding to the input recording signal; and waveform shaping section for shaping a waveform of the recording current in such a manner that a current value of the recording current infinitely approaches a predetermined value while keeping thereover throughout a period corresponding to the data length; both the recording circuit and the waveform shaping section being mounted in an integrated form on a single microchip.

The magnetic recording apparatus and the integrated circuit of the present invention guarantee the following advantageous results:

(1) Since the time needed for inversion of an electric polarity, or a rise time and a fall time, of a recording current is reduced, and particularly since the inversion of magnetization can be made rapidly even in a recording signal large in amplitude, data recording can be performed smoothly even for a high rate of transfer of the recording signal.

(2) Since the recording current infinitely approaches the magnetization inverse level, it is free of noises, reducing transition and track edge noises.

(3) A track width recorded at the lowest recording frequency can be approximate to that recorded at the highest recording frequency.

(4) Data recording can be performed while the amplitude of a recording current is kept in low level, thus reducing the electric power consumption.

(5) Downsizing of the magnetic recording apparatus can be realized.

Other objects and further features of the present invention will be apparent from the following detailed description when read in conjunction with the accompanying drawings.

DESCRIPTION OF THE PREFERRED EMBODIMENT(S)

Preferred embodiments of the present invention will now be described in detail with reference to the accompanying drawings.

Figure 1:
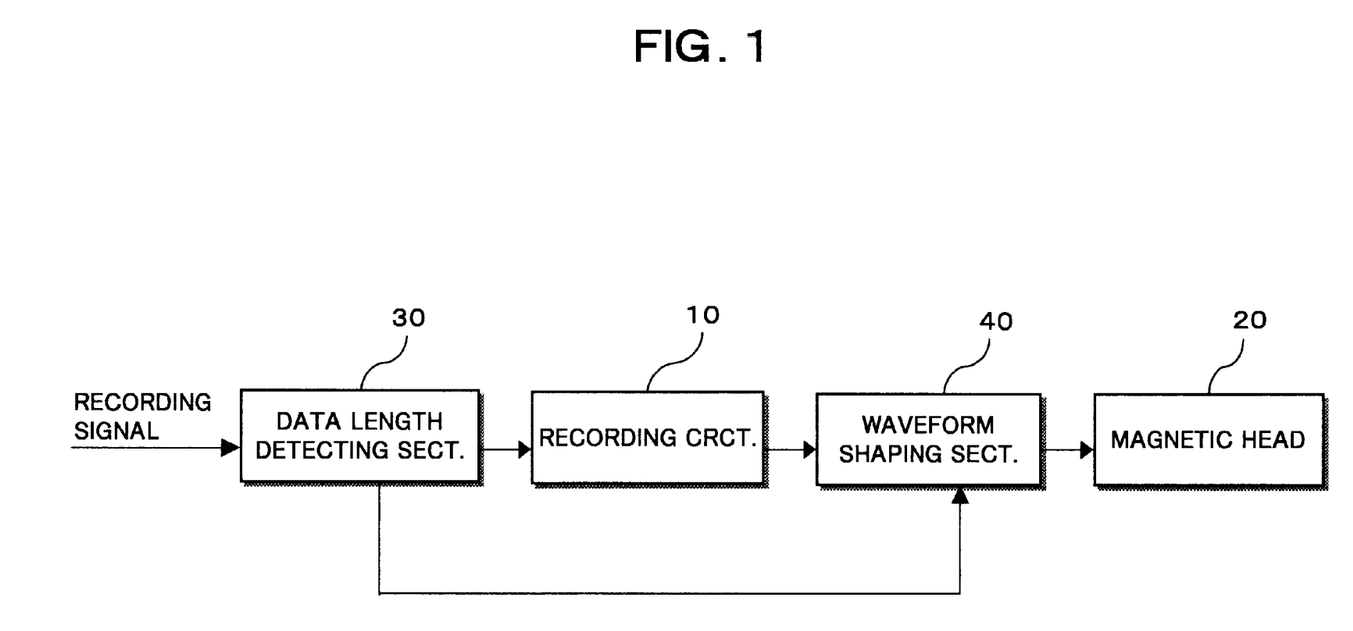
FIG. 1 is a block diagram generally showing a magnetic recording apparatus according to one embodiment of the present invention.
Figure 2:
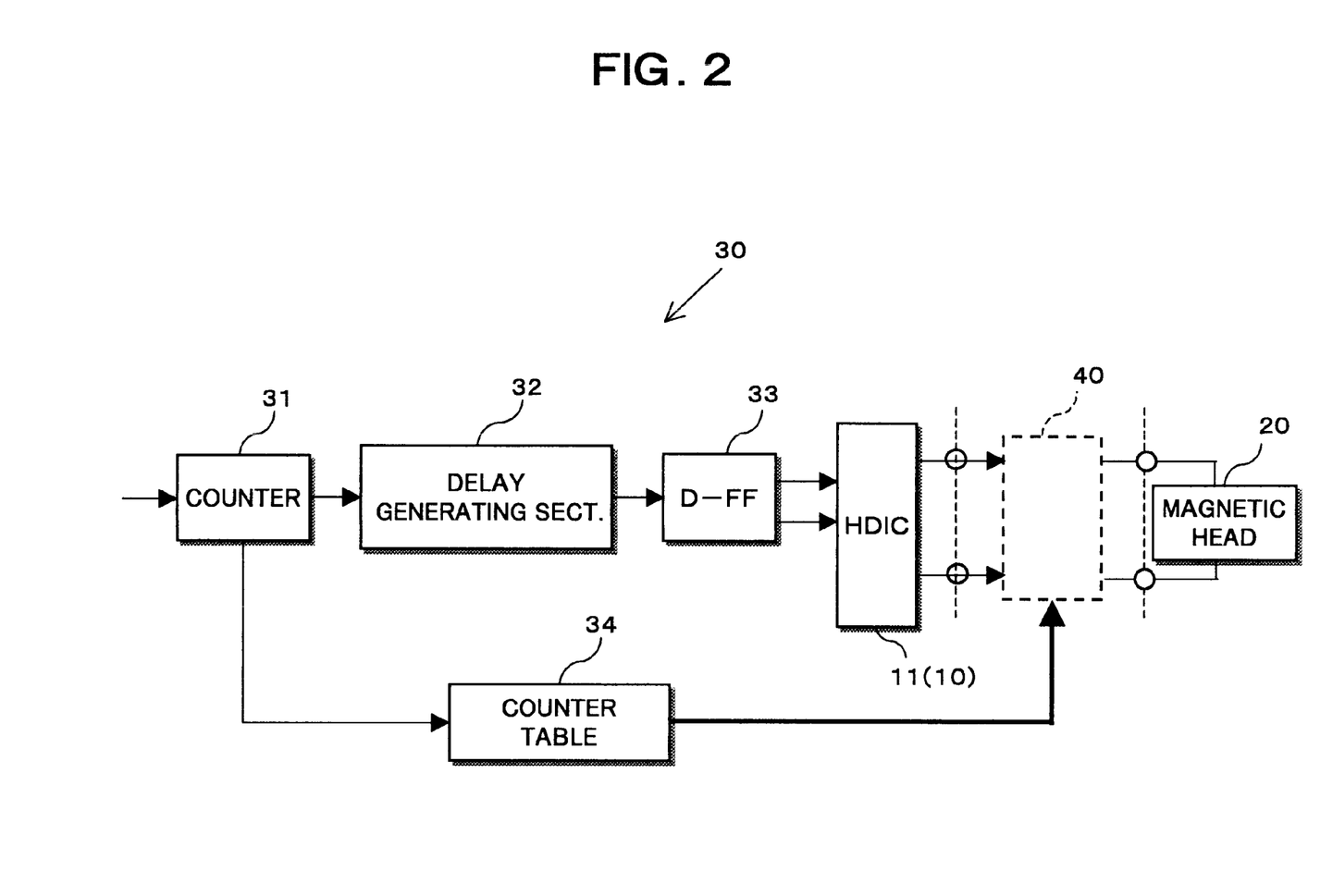
FIG. 2 is a block diagram showing a data length detecting section of the magnetic recording apparatus of FIG. 1.

FIG. 1 generally shows a magnetic recording apparatus according to one embodiment of the present invention; FIG. 2 shows a data length detecting section; and FIG. 3 shows a waveform shaping section.

The magnetic recording apparatus records data in a magnetic recording medium, such as a magnetic tape, a floppy disc or a magnetic disc. As shown in FIG. 1, the magnetic recording apparatus comprises a recording circuit 10, a magentichead 20, a data length detecting section 30, and a waveform shaping section 40.

Figure 3:
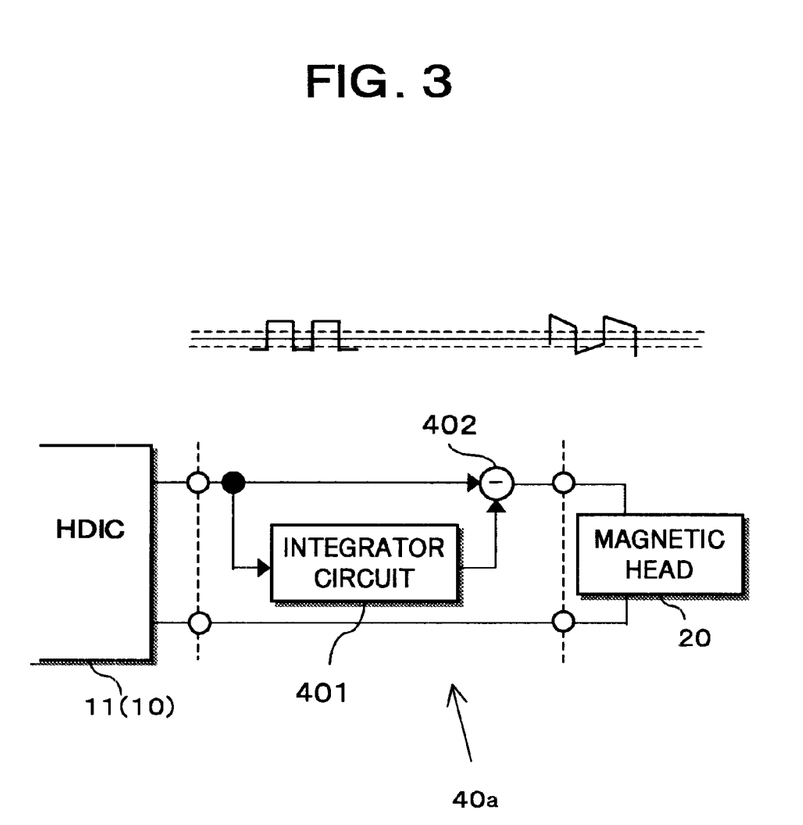
FIG. 3 is a circuit diagram showing a waveform shaping section of FIG. 1.

The recording circuit 10, which generates a recording current corresponding to an input recording signal, is in the form of an HDIC (Head IC) 11 as shown in FIGS. 2 and 3. The HDIC 11 serves as a preamplifier that forms a recording current energizing the magnetic head 20. The HDIC 11 forms the recording current corresponding to the input recording signal received from a non-illustrated upper apparatus or the like, and outputs the recording current having a square wave form.

The magnetic head 20 is energized by the recording current to record data corresponding to the recording signal into a magnetic recording medium.

The data length detecting circuit 30 detects a data length of the input recording signal in terms of a pulse width of the recording current to control the data length with respect to the recording current. As shown in FIG. 2, the data length detecting circuit 30 is composed of a counter 31, a delay generating section 32, a D-FF (D-Flip-Flop) 33, and a counter table 34.

The counter 31 counts a pulse width (data length) of an input recording signal using clocks, counting the numbers of 0s and 1s consecutively appearing in a data row. The counter 31 then sends this result number (count value) to the counter table 34.

The delay generating section 32 adjusts a delay of the data to be controlled and then sends the delay-adjusted data to the D-FF 33. The D-FF 33 controls the timing of the leading end of the received data so that the data is sent to the HDIC 11 in timed relation with the operation of the counter 31.

With the delay generating section 32 and D-FF 33, the recording current output from the HDIC 11 can be synchronized with the waveform shaping section 40.

The counter table 34 registers setting data corresponding to an address that is equal to a count value of the counter 31. This setting data is used in controlling the operation of the waveform shaping section 40 described later.

At that time, the setting data depends on the construction of the waveform shaping section as described later. For example, the setting data includes various coefficients relating to the elements constituting the waveform shaping section, and various other data can be registered depending on the construction of the waveform shaping section.

The waveform shaping section 40 shapes a waveform of a recording current such that a current value of the recording current infinitely approaches a magnetization inverse level (predetermined value) while keeping thereover throughout a period corresponding to the pulse width (data length). And the waveform shaping section 40 then inputs the resulting recording current into the magnetic head 20.

In this description and the drawings, reference numeral 40 designates any waveform shaping section in a generic sense, and reference numerals 40a, 40b, 40c, 40d, 40e designate various specific forms of waveform shaping sections individually.

The waveform shaping section 40a of FIG. 3, which is composed of an integrator circuit 401 and a subtractor 402, changes a current value of the recording current as if a linear function.

Specifically, as a waveform produced by the integrating circuit 401 is subtracted from a waveform output from the HDIC 11 by the subtractor 402, the level of the recording current is lowered after settling to shape the recording current into a sag-shaped waveform. The waveform shaping section 40a of FIG. 3 shapes the recording current into a desired sag-shaped waveform by changing a time constant of a capacitor, a resistor, a coil, or the like of the integrator circuit 401.

The waveform illustrated near and above the circuit of FIG. 3 represents that of the recording signal passing through the circuitry takes at a designated position. For example, as shown in FIG. 3, the output of the HDIC 11 has a square wave form, and this square is superposed by a waveform output from the integrator circuit, resulting in a sag-shaped waveform to be input to the magnetic head 20. The same rules of illustration are employed also for FIGS. 6 through 8, 10, and 11.

The setting data registered in the counter table 34 will now be described in detail. The maximal width (pulse width, i.e., data length) of a square-shaped portion of the recording current energizing the magnetic head 20 is a string of some bits in length. The number of the bits can be represented by a binary number, the number of whose digits, i.e. bits, is then registered into the counter table 34 in correlation with an address. For example, if the maximal bit width is 8 bits long, a numerical value of 8 can be represented by a binary number of 3 bits. Thus a value of 3 is registered in the counter table 34 in association with an address.

After that, 3-bit-length data corresponding to the address is added to actual data by the waveform shaping section 40*a* as the actual data is held waiting. Consequently, the output of the waveform shaping section 40*a* to the recording head 20 has a waveform such that its amplitude gradually decreases with respect to the data length while keeping in a level exceeding the magnetization inverse level (a predetermined level), thus obtaining a sag-shaped waveform with respect to the data length.

Specifically, a current value at which an inversion of magnetization occurs (the magnetization inverse level) is previously obtained, and at the same time, a current value exceeding the magnetization inverse level by some percents is calculated. Then setting data is obtained for controlling the waveform shaping section 40*a* to form the waveform so that the above current value of the recording current infinitely approaches the magnetization inverse level during the time from immediately after occurrence of a first inversion to that of the next inversion, or during the time in which a single pulse is formed, whereupon the setting data is registered into the counter table 34.

More specifically, this setting data is used in such a manner that, the amount resulting from the above waiting is reflected on a function. At that time, a coefficient of the function to be used can be set to meet the user's convenience. Further, immediately before occurrence of an inversion of magnetization, an amplitude of the recording current must be at such a level that no inversion of magnetization would occur; consequently the recording current amplitude also can be set to meet the user's convenience.

Figure 4:
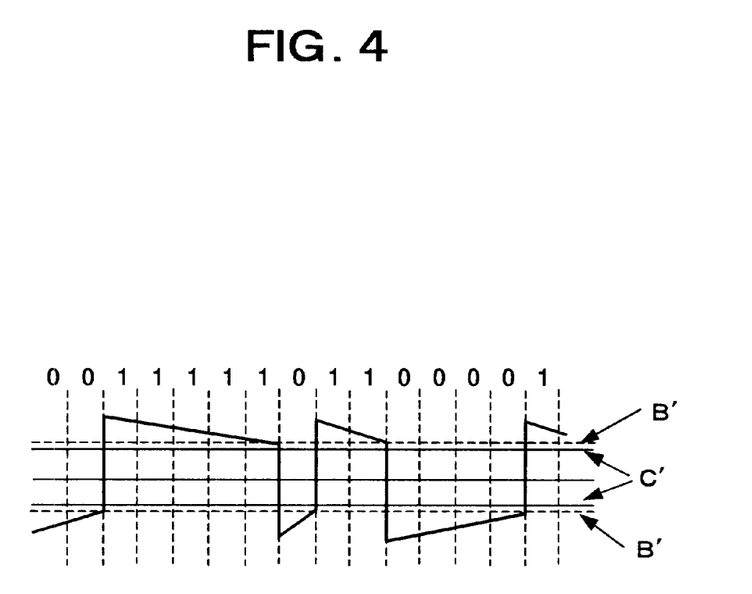
FIG. 4 is a diagram illustrating a waveform of a recording current as shaped by the waveform shaping section of FIG. 3.
Figure 5:
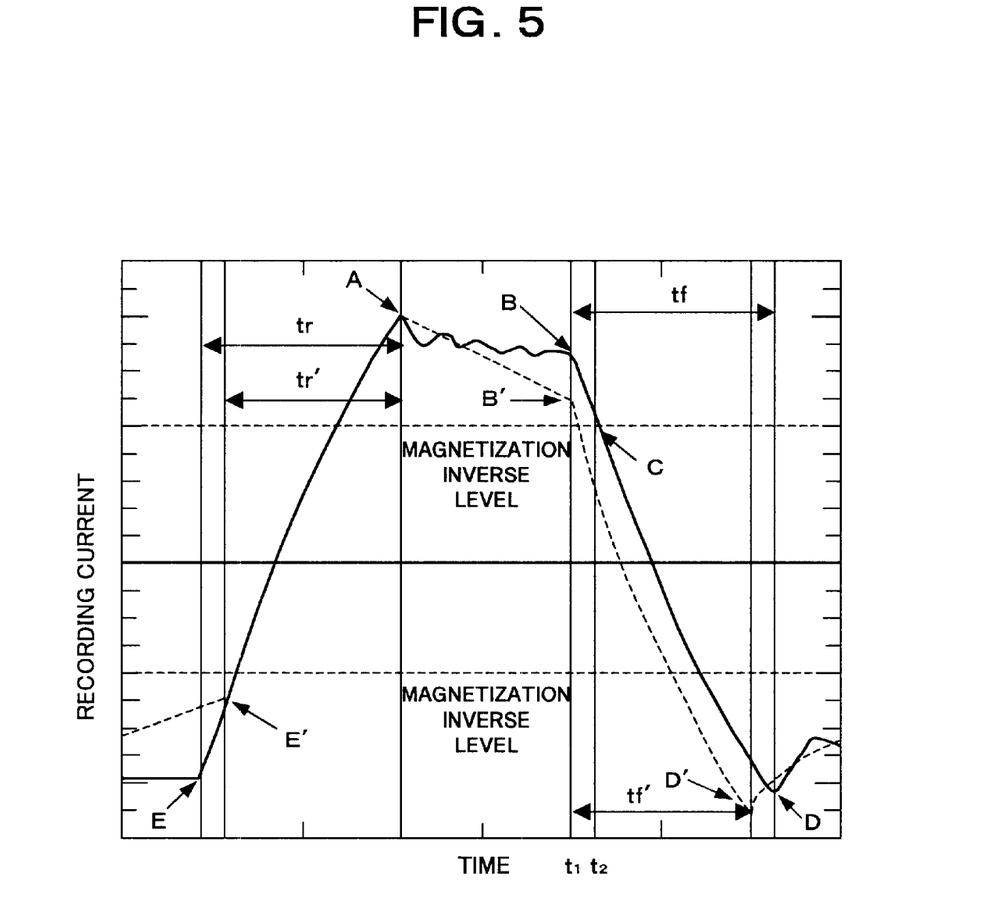
FIG. 5 is a diagram comparatively showing a comparative waveform of the recording current that was input to a recording head of a conventional magnetic recording apparatus and a waveform of the recording current as shaped by the waveform shaping section of the magnetic recording apparatus of the present embodiment.

FIG. 4 shows a waveform of a recording current as shaped by the waveform shaping section of the magnetic recording apparatus of the first embodiment. FIG. 5 shows a waveform as shaped by the waveform shaping section of the present invention, and a comparative waveform input to the recording head of the conventional magnetic recording apparatus.

As shown in FIG. 4, the waveform of the recording current as shaped by the waveform shaping section 40*a* is such that a current value of the recording current infinitely approaches the magnetization inverse level (C of FIG. 4), which is previously obtained as a predetermined value, while keeping in a level exceeding the predetermined value during a period of the detected number of clocks by the counter 31, or a period corresponding to the data length (B of FIG. 4).

With reference to FIG. 5, a comparison will now be made between a waveform as shaped by the waveform shaping section 40*a* and a waveform of a recording current as output by the HDIC 11. In FIG. 5, the comparative waveform of the recording current input to the recording head of the conventional magnetic recording apparatus is represented by a solid line while the waveform shaped by the waveform shaping section 40*a* of the present embodiment is represented by a broken line.

As shown in FIG. 5, based on the setting data registered in the counter 34, the waveform shaping section 40*a* shapes the waveform of the recording current in such a manner that a current value of the recording current infinitely approaches the magnetization inverse level (point C of FIG. 5) while keeping in a level exceeding the last-named level throughout a period (between points A and B of FIG. 5) corresponding to the data length (pulse width equal to the number of clocks). Thus the waveform shaping section 40*a* shapes the waveform of the recording current into a sag-shaped waveform.

Immediately before inversion of magnetization begins (time point t1 of FIG. 5), the waveform shaping section 40*a* keeps the level of the recording current equal to or larger (point B of FIG. 5 where no inversion of magnetization occurs) than the magnetization inverse level (point C of FIG. 5). At that time, the waveform shaping section 40*a* keeps the amplitude of the recording current equal to or smaller than that of the output of the HDIC 11 after settling (point B of FIG. 5) and also equal to or larger than the magnetization inverse level (point C of FIG. 5). Namely the point B' of FIG. 5 indicates the level at which the current value should be kept at a time point t1.

In this manner, when an inversion of magnetization occurs or when the recording current falls, for example, the recording current begins to fall from point B', whose current value is smaller than 10 that of point B, not from point B after settling, thus reducing a time period needed to complete the inversion of magnetization. In FIG. 5, as compared with the comparative time period tf needed for the output of the HDIC 11 to fall from point B to point D, the time period tf' needed for the output of the waveform shaping section 40*a* of the present invention to fall from B' to D' is short.

On the contrary, when the current rises, the current begins to rise from point E', whose current value is larger than that of point E, not from point E after settling but thus reducing a time period needed to complete the inversion of magnetization. In FIG. 5, as compared to the comparative time period tr needed for the output of the HDIC 11 to rise from point E to point A, the time period tr' needed for the output of the waveform shaping section 40*a* of the present invention to rise from E' to A' is short.

With this construction, when the magnetic recording apparatus records data in a magnetic recording medium, the counter 31 first counts the pulse width of a recording signal, which is received from the non-illustrated upper apparatus, to detect the pulse width as a data length and then send the data length (count value) to the counter table 34.

In the meantime, setting data registered in the counter table 34 at an address corresponding to the received data length is readout and sent to the waveform shaping section 40*a*.

After the delay of the recording signal passed through the counter 31 is adjusted by the delay generating section 32, a leading end of the signal is controlled by the D-FF 33. Then, the resulting recording signal is input to the HDIC 11. The HDIC 11 generates a recording current having an approximately square waveform corresponding to the input recording signal and then inputs the generated recording current to the waveform shaping section 40*a*.

Based on the setting data from the counter table 34, the waveform shaping section 40*a* forms the waveform of the recording current such that its current value infinitely approaches the magnetization inverse level while keeping in a level exceeding the last-named level, thus obtaining a sag-shaped waveform whose current value keeps exceeding the magnetization inverse level.

Thus the time needed for reversing the magnetic polarity, or a rising time and a falling time, of the recording current can be shortened. Especially, even in a recording signal large in amplitude, inversion of magnetization is carried out rapidly, realizing smooth recording of data in a magnetic recording medium even if a transfer rate of th e recording signal is high.

Further, given that the recording current infinitely approaches the magnetization inverse level, it is possible to reduce noises, such as a transition noise and a track noise. Also, a track width recorded at the lowest recording frequency can be made approximate to that recorded at the highest recording frequency.

Furthermore, since the data recording is performed while keeping the amplitude of the recording current at a low level, the electrical power consumption can be reduced.

Still further, the present invention should by no means be limited to the above-illustrated embodiment, but various changes or modifications may be suggested without departing from the gist of the invention.

Figure 6:
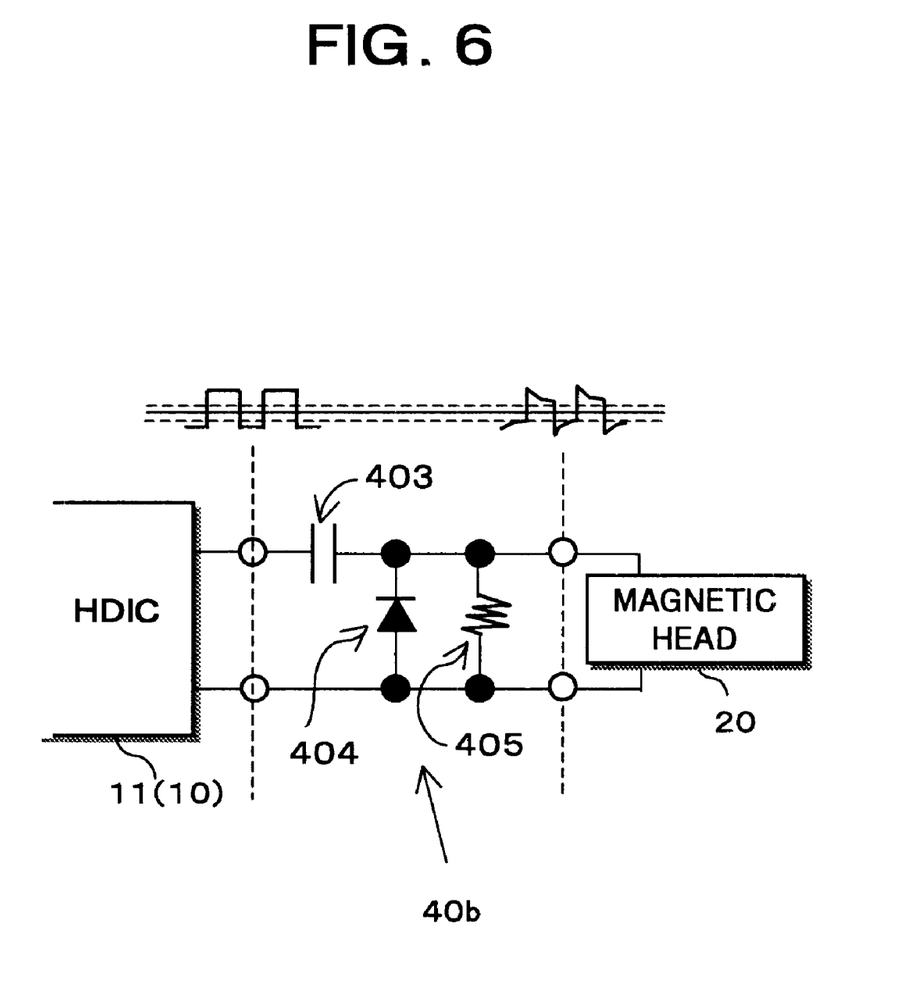
FIGS. 6 through 8 are circuit diagrams showing modified circuit forms of the waveform shaping section of the magnetic recording apparatus of the present embodiment.

As exemplified in the circuit of FIG. 6, the waveform shaping section of the present embodiment may have an alternative form; it includes a waveform shaping section 40b in place of the waveform shaping section 40a.

The waveform shaping section 40b, which is in the form of a direct current circuit employing a diode 404, changes the current value of a recording current as if an exponential function or a logarithmic function. Specifically, the waveform shaping section 40b composed of a capacitor 403, the diode 404, and a resistor 405 shapes the waveform of the recording current into a sag form.

The waveform shaping section 40b composed of the direct current circuit including the diode 404 changes a resistance value of the resistor 405 in accordance with setting data previously registered in the counter table 34, thus shaping the waveform of a recording current into a desired sag form.

At that time, in the magnetic recording apparatus equipped with the waveform shaping section 40b in the form of the direct current circuit employing the diode 404 as shown in FIG. 6, the counter table 34 holds the data registered therein for changing a time constant or other values.

Figure 7:
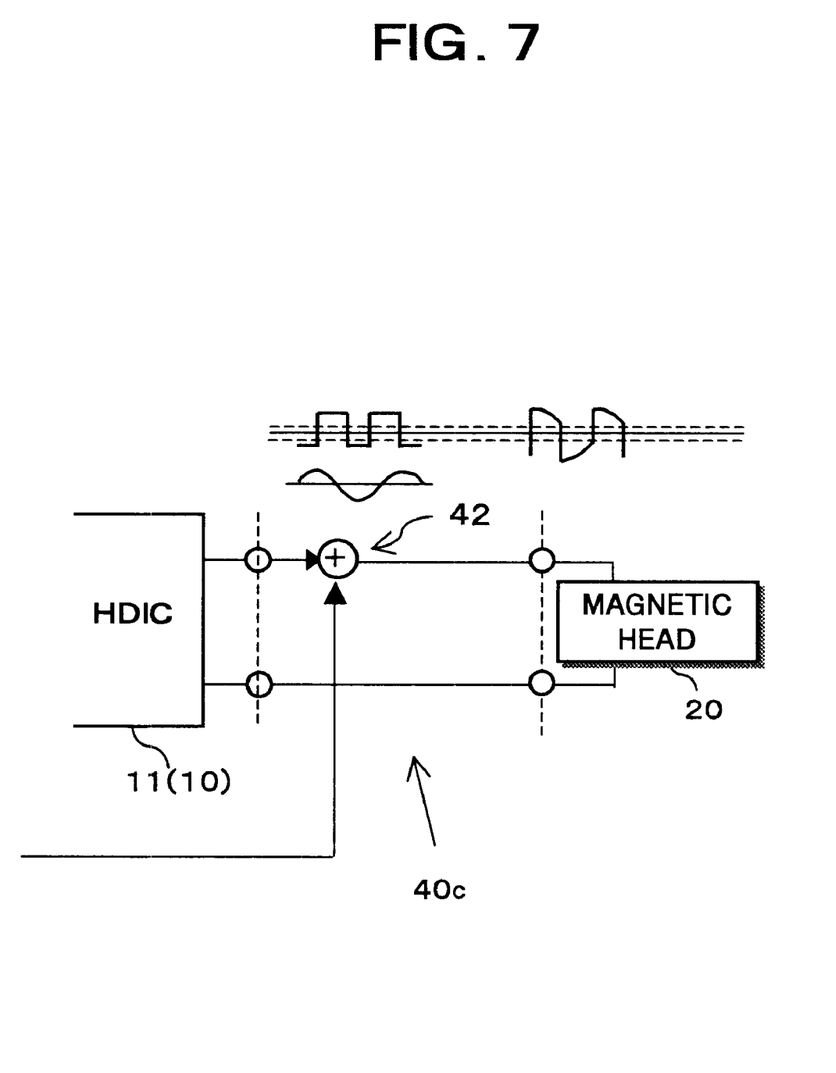

As exemplified in the circuitry of FIG. 7, the waveform shaping section of the first embodiment may have another alternative form; it includes a waveform shaping section 40c in place of the waveform shaping section 40a.

The waveform shaping section 40c changes the current value of a recording current as if a trigonometric function by synchronizing a sine wave with the recording current. For this purpose, the waveform shaping section 40c is equipped with an adder 42, which adds the sine wave to the recording current output from the HDIC 11. The waveform shaping section 40c changes a waveform, frequency, or timing, of the sine wave in accordance with setting data previously registered in the counter table 34, thereby obtaining a desired sag-shaped waveform.

At that time, in the magnetic recording apparatus equipped with the waveform shaping section 40c in the form of a direct current circuit employing the diode 404 as shown in FIG. 7, the counter table 34 holds the data registered therein for changing a waveform, frequency, timing, or the like, of the sine wave.

Figure 8:
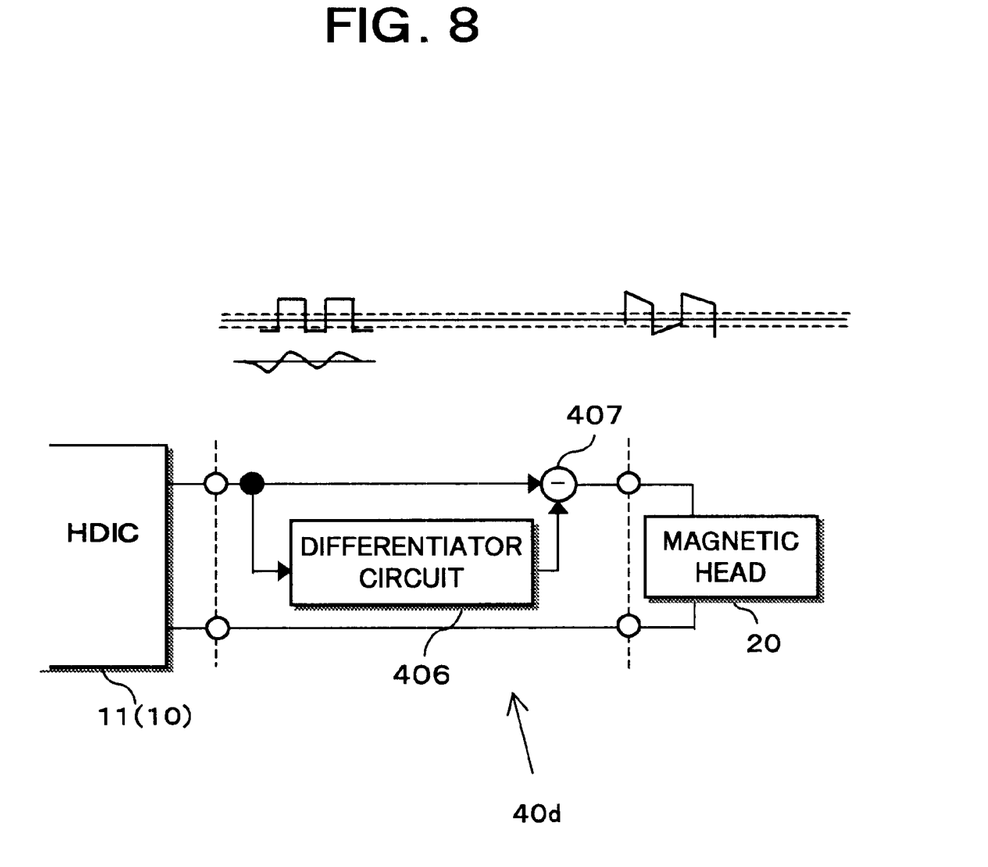

As exemplified in the circuitry of FIG. 8, the waveform shaping section of the first embodiment may have still another alternative form; it includes a waveform shaping section 40d in place of the waveform shaping section 40a.

The waveform shaping section 40d, which is composed of a differentiator circuit 406 and a subtractor 407, changes the current value of a recording current as if a linear function. Specifically, the waveform formed by the differentiator circuit 406 is subtracted from the waveform output from the HDIC 11 by the subtractor 407, lowering the level of the recording current after settling, thus obtaining a sag-shaped waveform. The waveform shaping section 40d of FIG. 8 changes a time constant of a capacitor, a resistor, a coil, etc., of the differentiator circuit 406, thereby obtaining a desired sag-shaped waveform.

At that time, in the magnetic recording apparatus equipped with the waveform shaping section 40d in the form of a direct current circuit employing the diode 404 as shown in FIG. 8, the counter table 34 holds the data for changing the time constant of the capacitor, the resistor, the coil, etc., of the differentiator circuit 406, registered therein.

Figure 9:
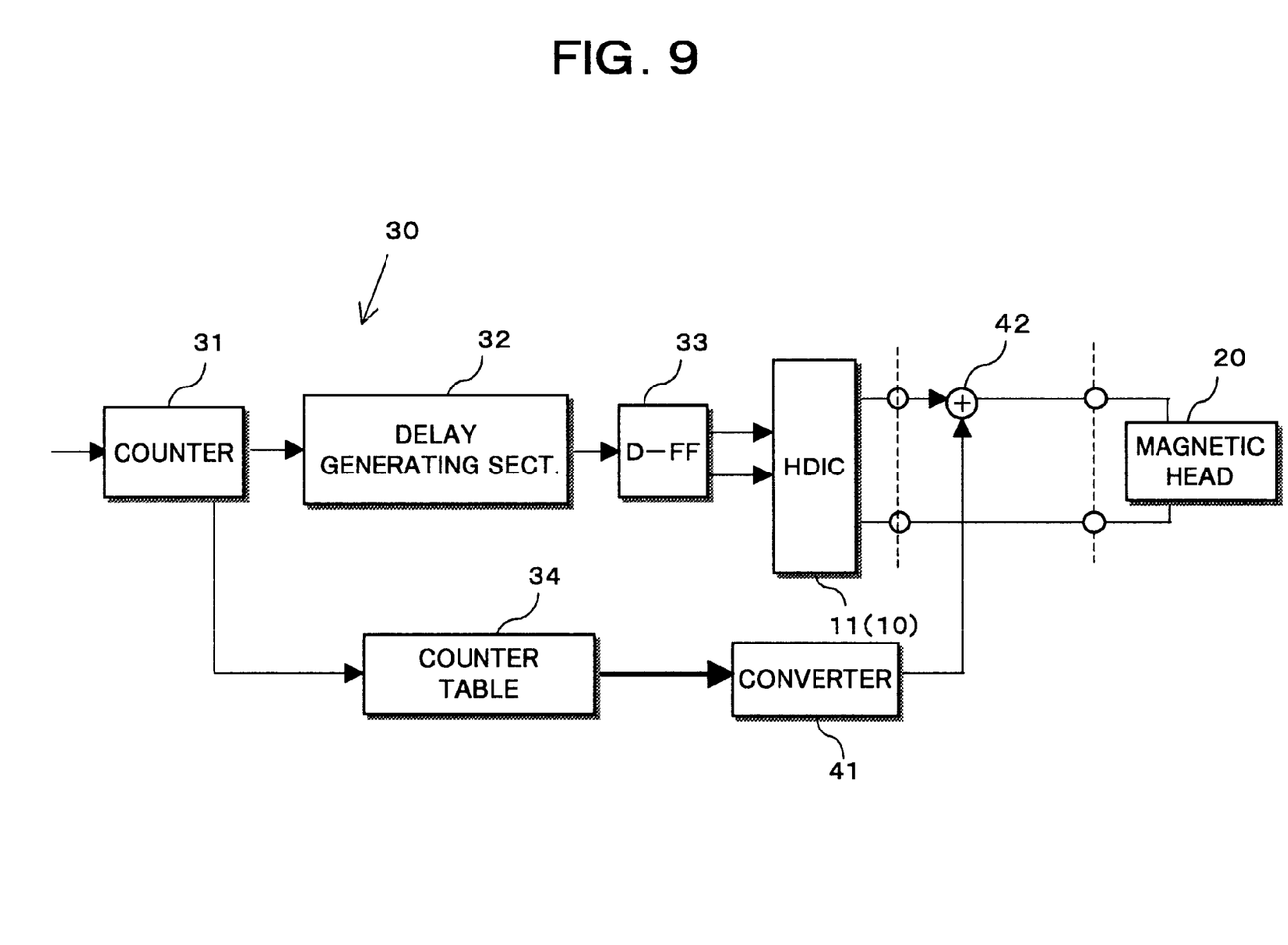
FIG. 9 is a block diagram showing a modified form of the data length detecting section of the magnetic recording apparatus of the present embodiment.
Figure 10:
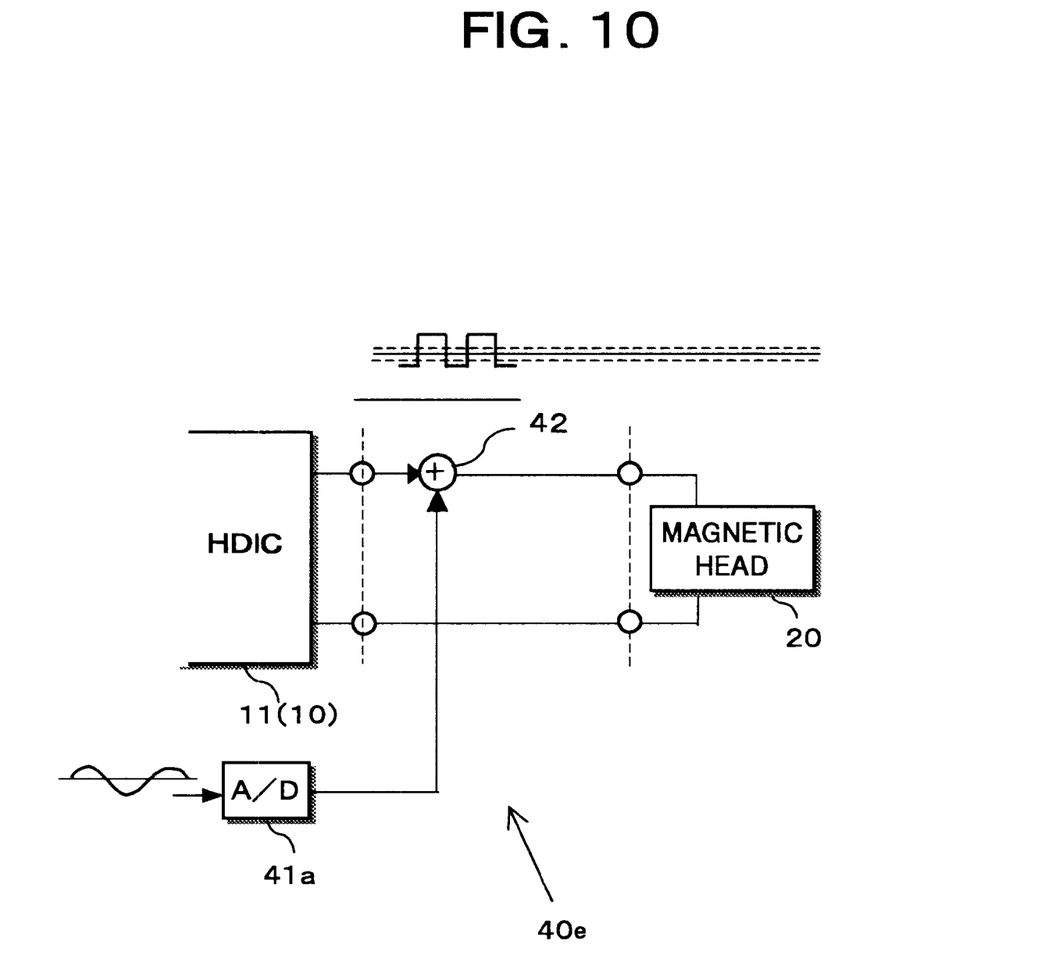
FIGS. 10 and 11 are circuit diagrams showing modified circuit forms of the waveform shaping section of the magnetic recording apparatus of the present embodiment.
Figure 11:
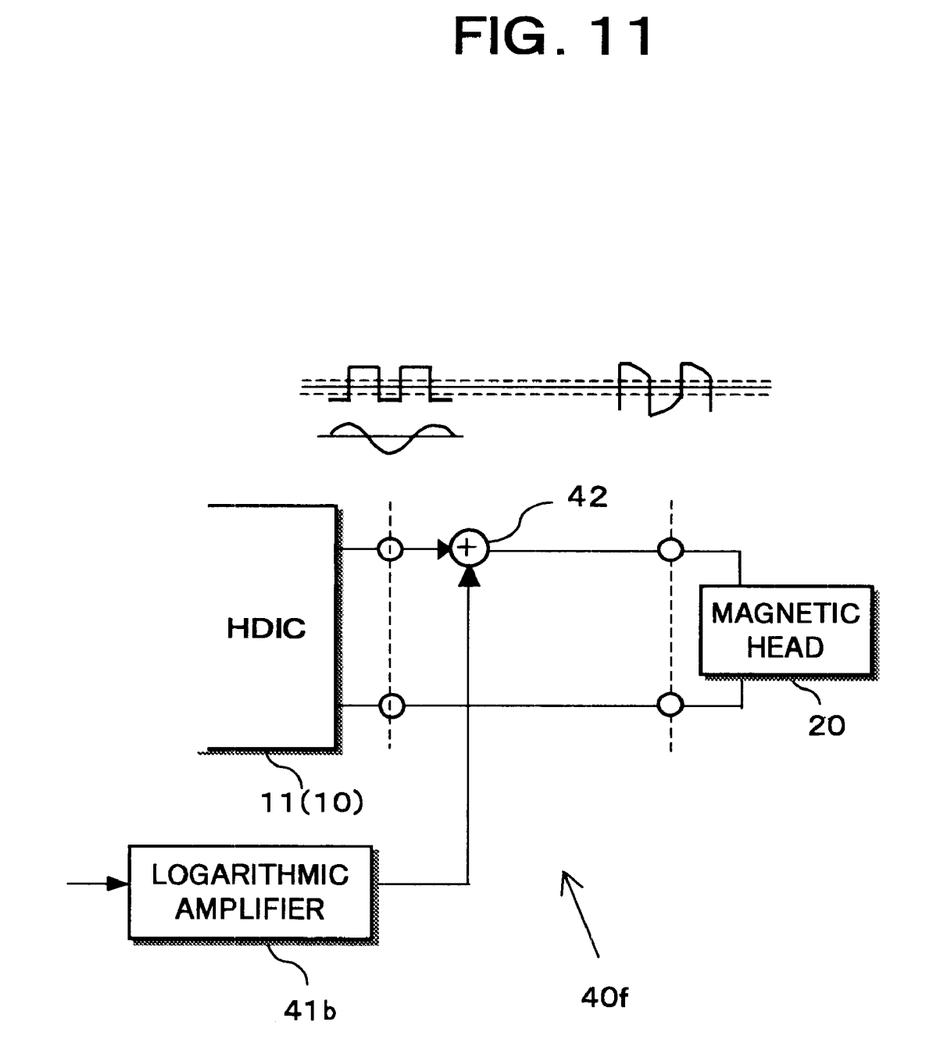

As exemplified in FIG. 9, the data length detection shaping section of the first embodiment may have another alternative form. In the circuit of FIGS. 10 and 11, other alternative forms of the waveform shaping section of the present embodiment are illustrated. In each of these alternative forms, the output of the above-described data length detecting section 30 is first input into a converter 41 of the waveform shaping section 40 and then added by the adder 42 to the recording current output from the HDIC 11.

As an example of the waveform shaping section 40 equipped with the converter 41, a waveform shaping section 40e may include an A/D converter 41a as shown in FIG. 10. In this waveform shaping section 40e, after a sine wave, for example, is converted into a digital signal through the A/D converter 41a, the digitized sine wave is added by the adder 42 to a square wave output from the HDIC 11 in synchronism with a recording signal input to the HDIC. Thus the recording current is changed as if a step function into a sag-shaped waveform, thus lowering the level of the recording current after settling.

A waveform shaping section 40f includes a logarithmic amplifier 41b as shown in FIG. 11. In the waveform shaping section 40f, after passing a recording waveform received from the data length detecting section 30 through the logarithmic amplifier 41b, the recording waveform is added by the adder 42 to a square wave output from the HDIC 11 in synchronism with a recording current output from the HDIC 11. With this arrangement, the recording current is changed as if a hyperbolic function into a sag-shaped waveform, thus lowering the level of the recording current after settling.

In these manners, it is also possible to shape the waveform of the recording current such that the current value of a recording current infinitely approaches the magnetization inverse level (a predetermined value) while keeping in a level exceeding the last-named level throughout a period corresponding to a pulse width (data length). Therefore the same results as those according to the magnetic recording apparatus equipped with the waveform shaping section 40a can be provided.

Alternatively, the waveform shaping section, which shapes the waveform of the recording current such that a current value of a recording signal infinitely approaches the magnetization inverse level (predetermined value) while keeping in a level exceeding the last-named level throughout a period corresponding to a data length, may be disposed upstream of the recording circuit with the same results.

Figure 12:
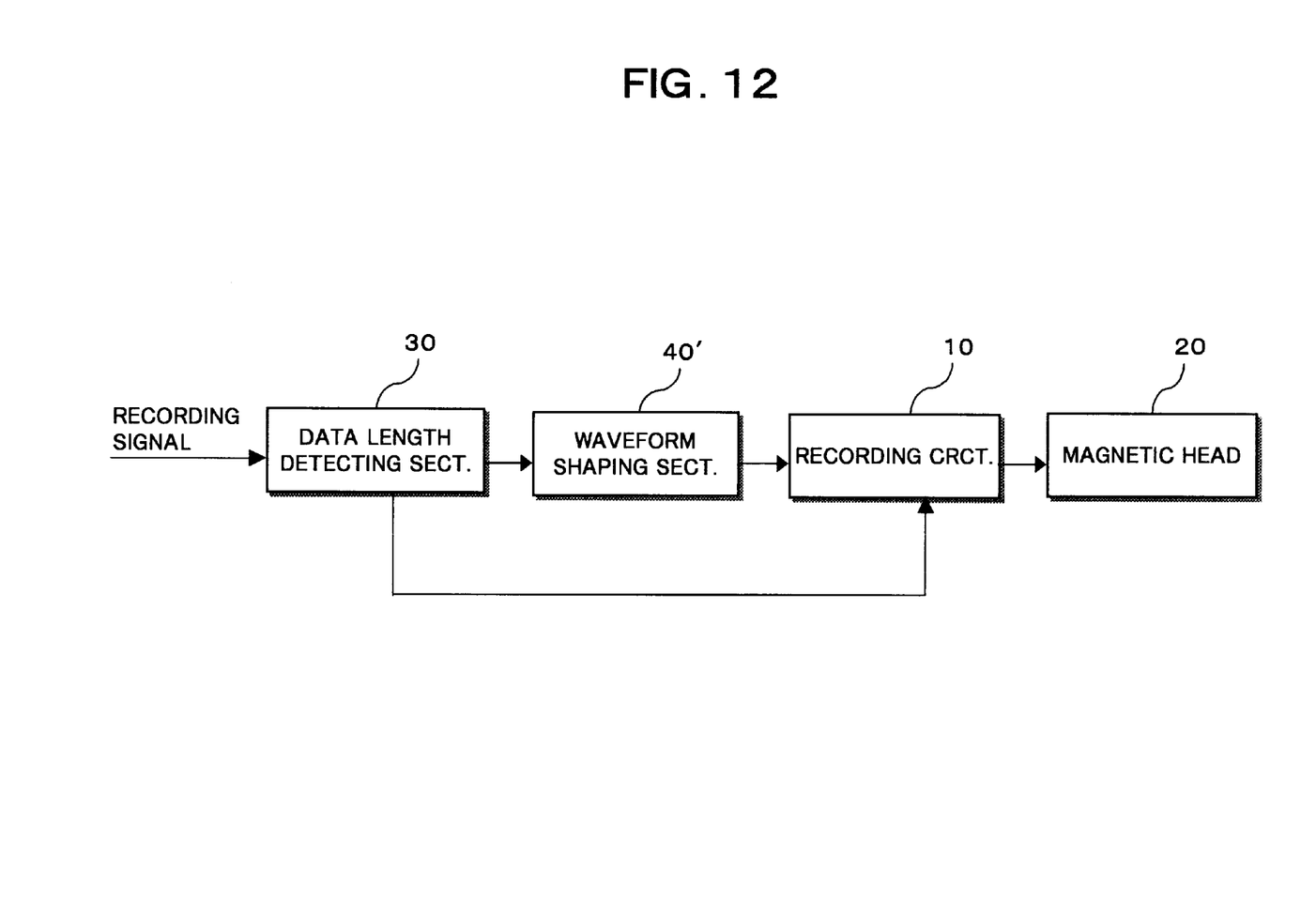
FIG. 12 is a block diagram generally showing a magnetic recording apparatus of another embodiment of the present invention.

FIG. 12 shows a magnetic recording apparatus according to a second embodiment of the present invention. The magnetic recording apparatus is equipped with a waveform shaping section 40' disposed upstream of the HDIC 11 (recording circuit 10). The waveform shaping section 40' shapes the waveform of the input recording signal in such a manner that the current value of the recording current infinitely approaches a predetermined value (the magnetization inverse level) while keeping in a level exceeding the last-named value throughout a period corresponding to a data length detected by the data length detecting section 30.

In the magnetic recording apparatus of FIG. 12, the waveform shaping section 40' shapes a recording signal into a sag-shaped waveform and then inputs the resulting recording signal into the recording circuit 10 with same results as mentioned above.

In the second embodiment, the waveform shaping section 40' may have any alternative form as of the waveform shaping sections 40a through 40f. Yet various other constructions may be applicable.

Further, both the waveform shaping section 40, 40' and the recording circuit 10 may be mounted on a common substrate, thus downsizing the magnetic recording apparatus.

Still further, the waveform shaping section 40, 40' may be in the form of an integrated circuit, thus also downsizing the magnetic recording apparatus.

Moreover, the recording circuit 10 and the waveform shaping section 40, 40' maybe integrated onto a single microchip, forming an integrated circuit for magnetic recording, thus downsizing the magnetic recording apparatus. On this microchip, the data length detection section 30, which detects a data length as a pulse width of the recording current, may be mounted. In this case, various changes or modifications maybe suggested for the waveform shaping section 40, 40' as described above.

In the foregoing embodiments, the data length detecting section 30 detects a data length as a pulse width of the recording current. Based on the data length, setting data is registered in the counter table 34 for use in controlling the operation of the waveform shaping section 40, 40'. However, the present invention should by no means be limited to this illustrated example, and any other construction may be applicable such that the level of the recording current infinitely approaches the magnetization inverse level, while keeping in a level exceeding the last-named level, after occurrence of inversion of magnetization.

What is claimed is:

1. A magnetic recording apparatus comprising:
    a recording circuit for generating a recording current corresponding to an input recording signal;
    a waveform shaping section for shaping a waveform of said recording current in such a manner that a current value of said recording current infinitely approaches a magnetization inverse level while keeping thereover throughout a period corresponding to a data length; and
    a magnetic head, operative in response to the recording current shaped by said waveform shaping section, for recording, in a magnetic recording medium, data corresponding to the input recording signal.

2. A magnetic recording apparatus comprising:
    a recording circuit for generating a recording current corresponding to an input recording signal;
    a waveform shaping section for shaping a waveform of said input recording signal in such a manner that a current value of said recording current infinitely approaches a magnetization inverse level while keeping thereover throughout a period corresponding to a length of said data to be recorded; and
    a magnetic head, operative in response to the recording current shaped by said waveform shaping section, for recording, in a magnetic recording medium, data corresponding to the input recording signal.

3. A magnetic recording apparatus according to claim 1, further comprising a data length detecting section for detecting a pulse width of said recording current as the data length.

4. A magnetic recording apparatus according to claim 2, further comprising a data length detecting section for detecting a pulse width of said recording current as the data length.

5. A magnetic recording apparatus according to claim 1, wherein both said waveform shaping section and said recording circuit are mounted on a common substrate.

6. A magnetic recording apparatus according to claim 2, wherein both said waveform shaping section and said recording circuit are mounted on a common substrate.

7. A magnetic recording apparatus according to claim 3, wherein both said waveform shaping section and said recording circuit are mounted on a common substrate.

8. A magnetic recording apparatus according to claim 4, wherein both said waveform shaping section and said recording circuit are mounted on a common substrate.

9. A magnetic recording apparatus according to claim 1, wherein said waveform shaping section is in the form of an integrated circuit.

10. A magnetic recording apparatus according to claim 2, wherein said waveform shaping section is in the form of an integrated circuit.

11. A magnetic recording apparatus according to claim 3, wherein said waveform shaping section is in the form of an integrated circuit.

12. A magnetic recording apparatus according to claim 4, wherein said waveform shaping section is in the form of an integrated circuit.

13. A magnetic recording apparatus according to claim 5, wherein said waveform shaping section is in the form of an integrated circuit.

14. A magnetic recording apparatus according to claim 6, wherein said waveform shaping section is in the form of an integrated circuit.

15. A magnetic recording apparatus according to claim 7, wherein said waveform shaping section is in the form of an integrated circuit.

16. A magnetic recording apparatus according to claim 8, wherein said waveform shaping section i:s in the form of an integrated circuit.

17. A magnetic recording integrated circuit for driving a magnetic head which is energized by a recording current to record, in a magnetic recording medium, data corresponding to an input recording signal, comprising:
    a recording circuit for generating the recording current corresponding to the input recording signal; and
    a waveform shaping section for shaping a waveform of said recording current in such a manner that a current value of said recording current infinitely approaches a magnetization inverse level predetermined value while keeping thereover throughout a period corresponding to the data length;
    both said recording circuit and said waveform shaping section being mounted in an integrated form on a single microchip.

* * * * *